(12) United States Patent
Lee et al.

(10) Patent No.: US 8,302,589 B2
(45) Date of Patent: Nov. 6, 2012

(54) TRANSMISSION METHOD AND TRANSMISSION MECHANISM FOR TOY GUN

(76) Inventors: Yi-Jung Lee, Taipei (TW); Li-Te Cheng, Taipei (TW)

( * ) Notice: Subject to any disclaimer, the term of this patent is extended or adjusted under 35 U.S.C. 154(b) by 232 days.

(21) Appl. No.: 12/853,402

(22) Filed: Aug. 10, 2010

(65) Prior Publication Data
US 2011/0214654 A1    Sep. 8, 2011

(30) Foreign Application Priority Data
Mar. 8, 2010   (TW) ................................ 99106550 A (51) Int. Cl.
*F41B 11/00*   (2006.01)
(52) U.S. Cl. .......................................... 124/66; 74/640
(58) Field of Classification Search .............. 124/63–68; 74/640
See application file for complete search history.

(56) References Cited

U.S. PATENT DOCUMENTS

| | | | | |
|---|---|---|---|---|
| 1,869,600 A | * | 8/1932 | Loomis | 124/67 |
| 3,119,383 A | * | 1/1964 | Foster | 124/9 |
| 3,189,015 A | * | 6/1965 | Foster | 124/47 |
| 3,225,754 A | * | 12/1965 | Foster | 124/9 |
| 3,612,025 A | * | 10/1971 | Rhodes | 124/9 |
| 3,800,775 A | * | 4/1974 | Darrell | 124/43 |
| 4,869,150 A | * | 9/1989 | Post et al. | 89/11 |
| 5,711,286 A | * | 1/1998 | Petrosyan et al. | 124/73 |
| 7,946,283 B2 | * | 5/2011 | Lee et al. | 124/67 |
| 2003/0160763 A1 | * | 8/2003 | Cheng et al. | 345/163 |
| 2005/0075044 A1 | * | 4/2005 | Cheng et al. | 446/475 |
| 2009/0038201 A1 | * | 2/2009 | Cheng et al. | 42/127 |

FOREIGN PATENT DOCUMENTS

| | | |
|---|---|---|
| TW | 097118085 | 5/1997 |
| TW | M347209 | 8/1997 |
| TW | M347209 | 12/2008 |
| TW | 097118085 | 12/2009 |

* cited by examiner

*Primary Examiner* — Michael David
(74) *Attorney, Agent, or Firm* — Hamre, Schumann, Mueller & Larson, P.C.

(57) ABSTRACT

A transmission method and a transmission mechanism for a toy gun are provided. The method comprises the steps of: moving a firing action backward by means of a gear assembly; moving the firing action forward by disengaging the gear assembly from the firing action and utilizing a spring to drive the firing action to move forward; controlling the movement of the gear assembly by means of a movement control assembly such that the gear assembly cannot mesh with the firing action; re-meshing the gear assembly with the firing action wherein after the firing action moves forward to a locating position, the gear assembly can mesh with the firing action again by the operation of the firing action and the movement control assembly; and repeating the step of moving the firing action backward to the step of re-meshing.

14 Claims, 9 Drawing Sheets

TRANSMISSION METHOD AND TRANSMISSION MECHANISM FOR TOY GUN

BACKGROUND OF THE INVENTION

1. Field of the Invention

The present invention relates to a transmission method and transmission mechanism for a toy gun, and more particularly, to a method that controls the movement of a firing action in an air gun, and a related mechanism that drives the firing action to move.

2. Description of Related Art

A toy gun is a kind of gun for game that utilizes the compressed air to eject BB bullets, of which the lethality is not like a real gun. However, in order to make the operation and appearance of a toy gun look like a real gun, the industry spends much time and effort on development and research, such that except the lethality, both the operation and appearance of a toy gun can be similar to a real gun.

The applicant of the present invention has ever filed a Taiwan Invention Patent Application No. 097118085 entitled "A MOVEMENT STRUCTURE FOR A FIRING ACTION OF A TOY GUN", disclosing that when a toy gun eject BB bullets, the firing action can simulate the shooting of a real gun and moves forward and backward in the firing action chamber, wherein the gear assembly of toy gun is driven by an electric motor, which actuates the running of each mechanical assembly inside the toy gun to complete the whole operating procedure and achieve the effect of simulating a real gun. However, when the toy gun is out of electric power, it is most likely that the firing action cannot work. Thus, the applicant of the present invention has also filed a Taiwan Utility Model Patent Application (Patent No. M347209) entitled "A PREVENTING-STUCK MECHANISM FOR TOY GUN". By the unique combination of a gear design and a one-way detent, the problem of the use of the aforesaid firing action movement structure can be solved. That is, when the electric power for the toy gun is cut off, the firing action still can perform one-bullet-shot in a manual manner.

However, in the use of the above-mentioned preventing-stuck mechanism for the toy gun, there are still some problems listed as follows:

1. During the normal electric power, the ring gear will still continuously run to drive the first gear to rotate. However, before the firing action moves forward to a locating position, if the teeth of the first gear already mesh with the firing action, then the meshing timing that the teeth of the first gear mesh with the firing action will become disordered, so that the firing action cannot further move to the position, and at this time, the firing action cannot further precisely move, which might even cause the damage of the gears,
2. When the cartridge case of the toy gun is stuck in the firing action chamber, the firing action still cannot move forward to the position, and at this time, the ring gear will still drive the first gear to rotate, so that the meshing between the teeth of the first gear and the firing action becomes dislocated, which causes the same problem mentioned above.
3. When the output power of the battery is too large such that the rotational speed of the ring gear is too fast, the teeth of the first gear might mesh with the firing action too early due to the too fast rotational speed, which will similarly become dislocated and make the firing action unable to further work.

Therefore, although the preventing-stuck mechanism mentioned above can provide the effect of continuous working of the firing action the electric power is cut off, in the normal electric power the problem of non-working of the firing action still happens. Thus, it needs to be improved.

SUMMARY OF THE INVENTION

The present invention provides as transmission method and transmission mechanism which can assure the normal operation of the action of a toy gun, no matter the electric power is normal or cut off.

The transmission method of the present invention comprises the following steps:

moving a firing action backward by means of a gear assembly which is driven by electric power to make the firing action move backward;

moving the firing action forward by disengaging the gear assembly from the firing action and utilizing a spring of the firing action to drive the firing action to move forward;

controlling the movement of the gear assembly by means of a movement control assembly which controls the gear assembly such that the gear assembly cannot mesh with the firing action;

re-meshing the gear assembly with the firing action, wherein after the firing action moves forward to a locating position, the gear assembly can mesh with the firing action again by the operation of the firing action and the movement control assembly; and repeating the step of moving the firing action backward to the step of re-meshing.

By using the method mentioned above, before the firing action moves forward to the position, the gear assembly will not mesh with the firing action due to the movement control assembly. Thus, the meshing dislocation between the firing action and the gear assembly will not happen. Therefore, it will not happen that the firing action cannot work under the normal electric power. On the other hand, when the electric power is cut off, a user can disengage the gear assembly from the firing action in a manual manner so that the user can perform one-bullet-shot of a toy gun manually.

The transmission mechanism of a toy gun according to the present invention comprises a gear assembly that can mesh with the firing action and a movement control assembly that can control the movement of the gear assembly, wherein the gear assembly at least includes:

a movement control gear, of which the partial outer periphery is provided with teeth which can mesh with the firing action;

a ring gear, which can engage with the movement control gear and can selectively move with the movement control gear, and of which the inner edge is provided with at least a securing recess and the outer edge is provided with teeth; and a detent assembly, which is located in the ring gear, and of which one end is eccentrically pivotally mounted on the movement control gear, and the other end is detachably positioned in the securing recess of the ring gear, the detent assembly being provided with a detent block exposed outside the ring gear; wherein the movement control assembly can abut against or move away from the detent block of the detent assembly, so that the detent block can disengage from or be secured in the securing recess.

By the mechanism described above, when the movement control assembly pushes the detent block of the detent assembly away from the securing recess and thus releases the linkage state between the ring gear and the movement control gear so that the rotation of the ring gear will not make the movement control gear rotate therewith. Hence, the teeth of the movement control gear will not mesh with the firing action. When the movement control assembly does not push the detent block, the detent block will move back to the securing recess, so that the movement control gear will rotate with the ring gear again by the rotation of the ring gear, and then make the firing action perform the backward movement.

DETAILED DESCRIPTION OF THE INVENTION

The detailed description about the method of the transmission for the toy gun of the present invention is stated as follows. The transmission method for the toy gun of the present invention comprises the following steps:

moving a firing action backward by means of a gear assembly which is driven by electric power to make the firing action move backward, wherein the gear assembly is driven by an electric motor to rotate via a gear or a belt, and the gear assembly is provided with teeth which can mesh with the firing action, and the firing action is provided with a meshing recess for meshing with the teeth;

moving the firing action forward by disengaging the gear assembly from the firing action and utilizing a spring of the firing action to drive the firing action to move forward, wherein when the teeth of the gear assembly entirely disengage from the meshing recess of the firing action, the firing action will disengages from the pear assembly and move forward by means of the elastic force of the spring;

controlling the movement of the gear assembly by means of a movement control assembly which controls the gear assembly such that the gear assembly cannot mesh with the firing action, wherein when the firing action moves forward to a locating position, the movement control assembly will block the rotation of the gear assembly such that the teeth of the gear assembly cannot mesh with the meshing recess of the firing action;

re-meshing the gear assembly with the firing action, wherein after the firing action moves forward to the locating position, the gear assembly can mesh with the firing action again by the operation of a piston of the firing action and the movement control assembly, and wherein when the piston of the firing action moves forward by means of a spring, the piston will push the movement control assembly such that the movement control assembly cannot block the rotation of the gear assembly and dins makes the gear assembly mesh with the firing action again; and repeating the step of moving the firing action backward to the step of re-meshing.

Figure 1:
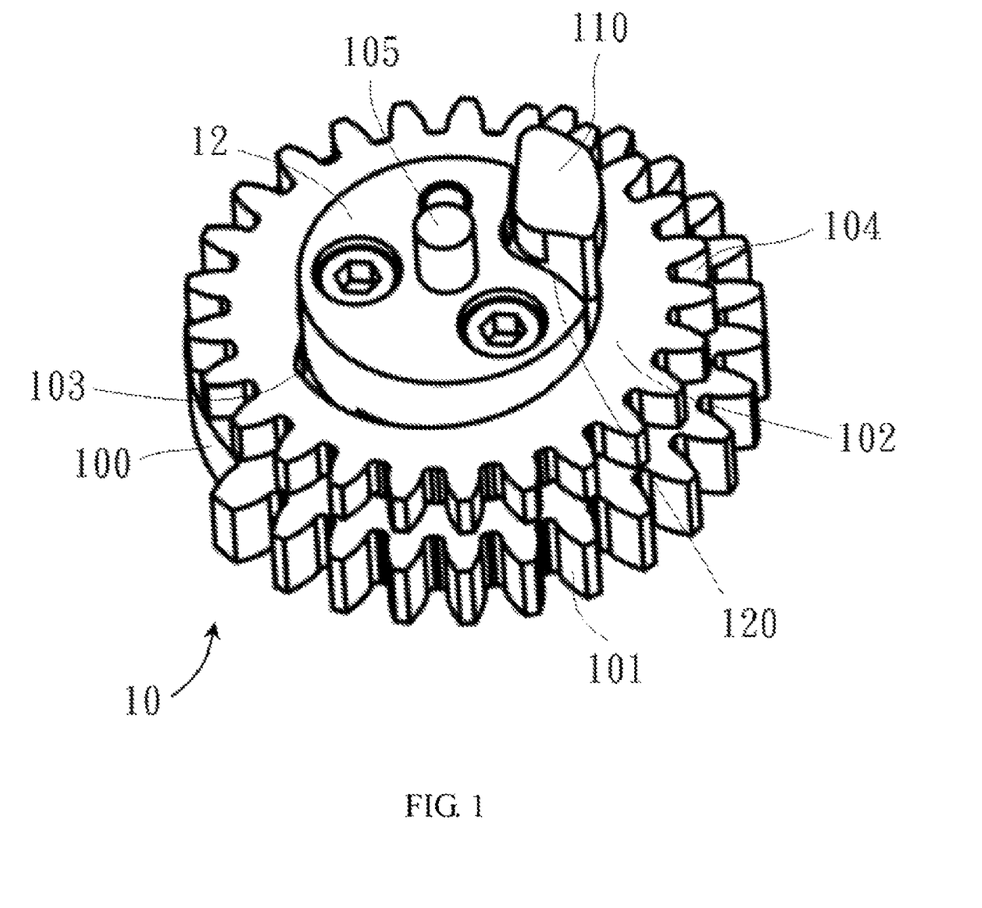
FIG. 1 is a front perspective view of the gear assembly of the transmission mechanism according to the present invention.
Figure 2:
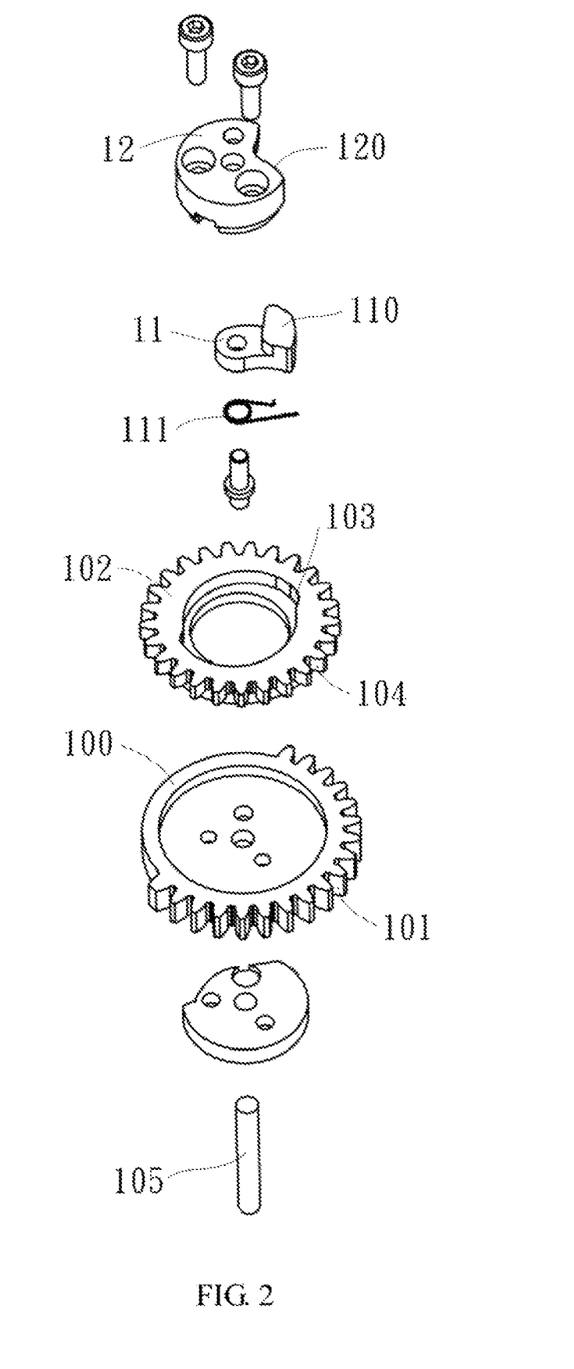
FIG. 2 is an exploded perspective view of FIG. 1.
Figure 3:
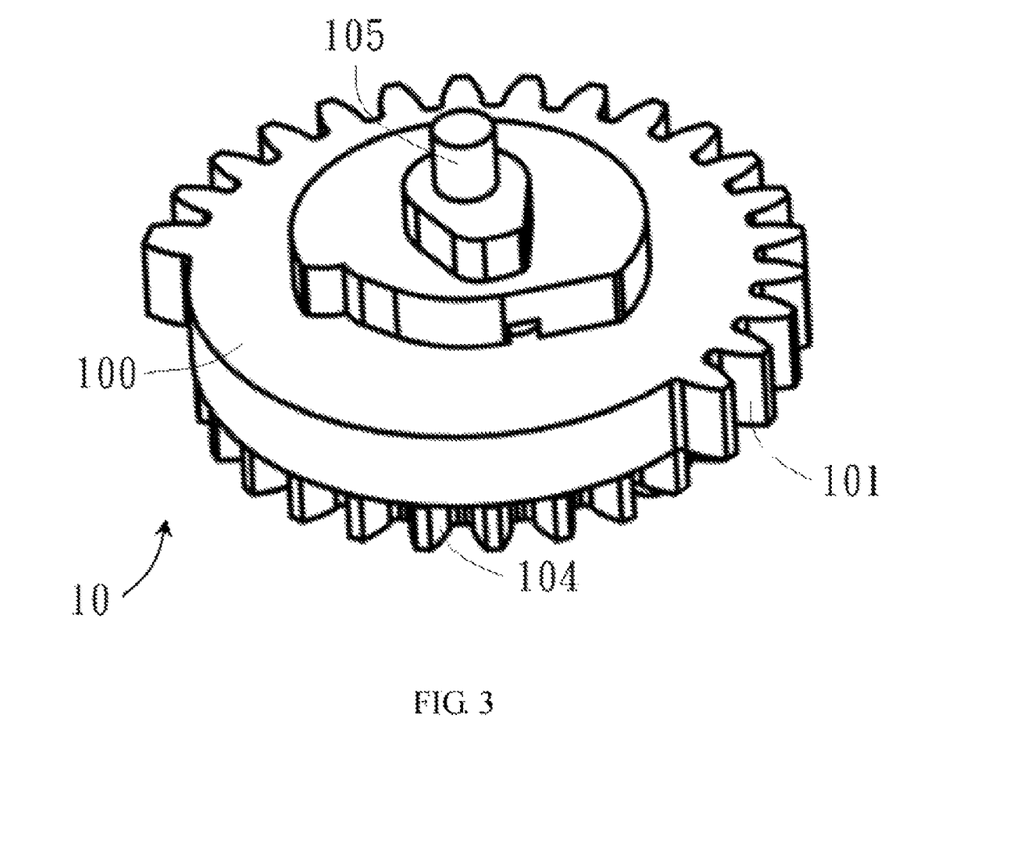
FIG. 3 is a rear perspective view of the gear assembly of the transmission mechanism according to the present invention.
Figure 4:
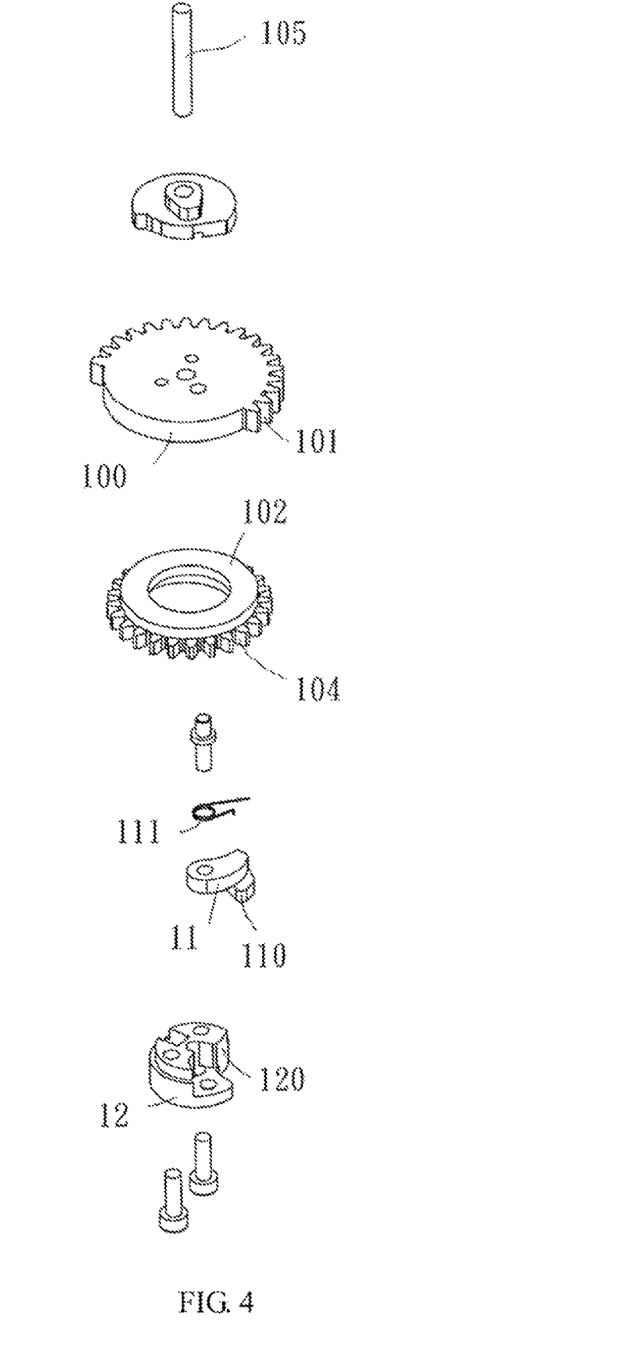
FIG. 4 is an exploded perspective view of FIG. 3.
Figure 5:
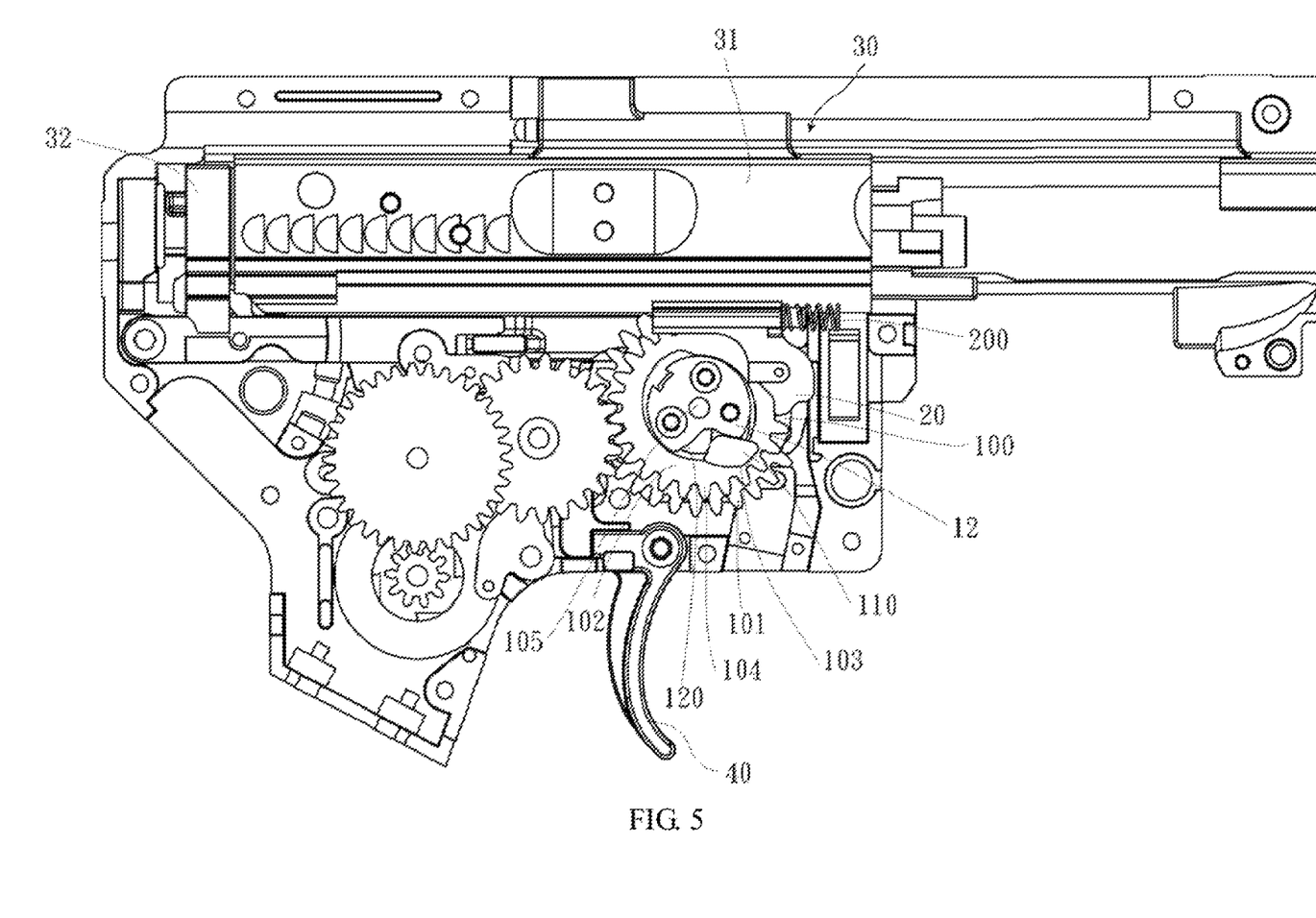
FIG. 5 is a schematic view showing the status of the detent block which does not yet contact with the movement control assembly during the rotation of the gear assembly according to the present invention.

Please refer to the FIG. 1 to the FIG. 5. Now an embodiment of the transmission mechanism of the toy gun according to the present invention is described by the accompanying figures. The transmission mechanism of the toy gun according to the present invention comprises a gear assembly 10 that can mesh with a firing action 30 and a movement control assembly 20 that can control the movement of the gear assembly 10. The firing action 30 of the embodiment comprises a cylinder 31 and a piston 32. The cylinder 31 and the piston 32 can store an elastic force by means of an elastic assembly not shown in the figure), respectively. The gear assembly 10 at least comprises:

a movement control gear 100, of which the partial outer periphery of which forms teeth 101 that can mesh with the firing action 210;

a ring gear 102, which cooperates with the movement control gear 100 and can selectively move with the movement control gear 100; the inner periphery of the ring gear 102 being provided with securing recesses 103 respectively at opposing positions and the outer periphery of the ring gear being provided with teeth 104;

a detent assembly 11, which is located in the ring gear 102, and of which one end is eccentrically pivotally mounted on the movement control gear 100, and the other end is detachably positioned in the securing recess 103 of the ring gear 102; the detent assembly having as detent block 110 exposed outside the ring gear 102; and a cover 12, which is provided outside the ring gear 102 in order to position the detent assembly 11 in the ring gear 102, and has a receiving recess 120 for receiving the detent block 110 of the detent assembly 11.

The movement control assembly 20 can abut against or move away from the detent block 110 of the detent assembly 11 by means of the cooperation of the piston 32 of the firing action 30, so that the detent block 110 can move between the securing recess 103 and receiving recess 120.

In the embodiment, a central shaft 105 threads through the centers of the movement control gear 100, the ring gear 102 and the cover 12. Further, the detent assembly 11 is mounted in the ring gear 102 by means of a torsion spring 111. One end of the torsion spring 111 abuts against the central shaft 105 and the other end abuts against one side of the detent assembly 11 such that the one end of the detent assembly 11 provided with the detent block will be usually with a stored elastic force toward the outside direction of the gear assembly 10 (i.e. the extending direction of teeth 101, 104). The movement control assembly 20 further comprises a return spring 200 as shown in FIG. 5.

The operation way for the transmission mechanism of the toy gun according to the present invention is described as follows.

Please refer to FIG. 5. When running under normal electric power, the ring gear 102 of the gear assembly 10 is driven to rotate by a motor (not shown in the figure). At this time, due to pivotally outward rotation of the detent assembly 11 via the stored elastic three of the torsion spring 111, the detent block 110 is secured in the securing recess 103 and thus can be driven to rotate by the ring year 102. Further, since one end of the detent assembly 11 is eccentrically pivotally mounted on the movement control gear 100, the movement control gear 100 is linked to rotate therewith.

Figure 6:
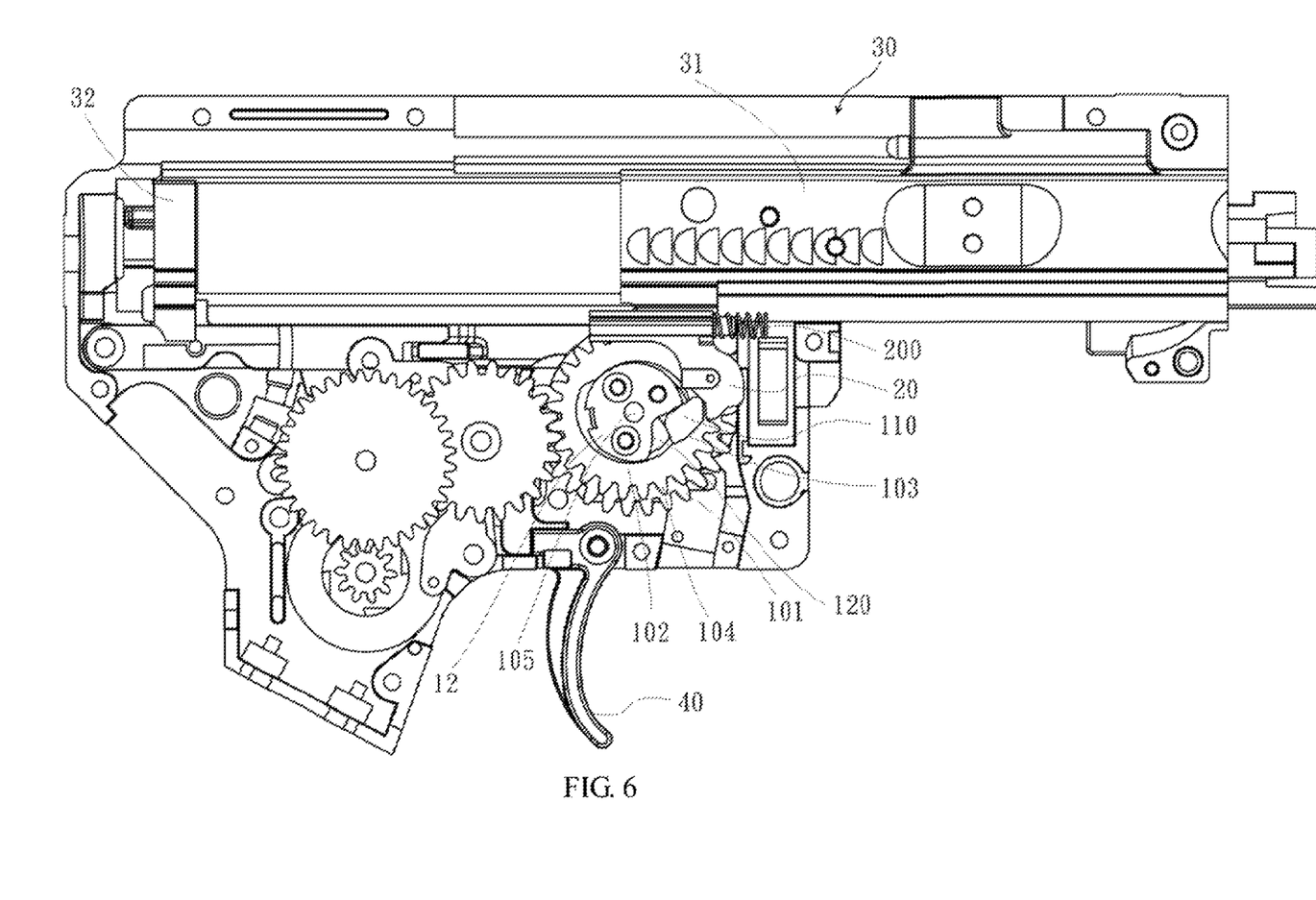
FIG. 6 is a schematic view showing the status of the detent block which contacts with the movement control assembly during the rotation of the gear assembly according to the present invention.
Figure 7:
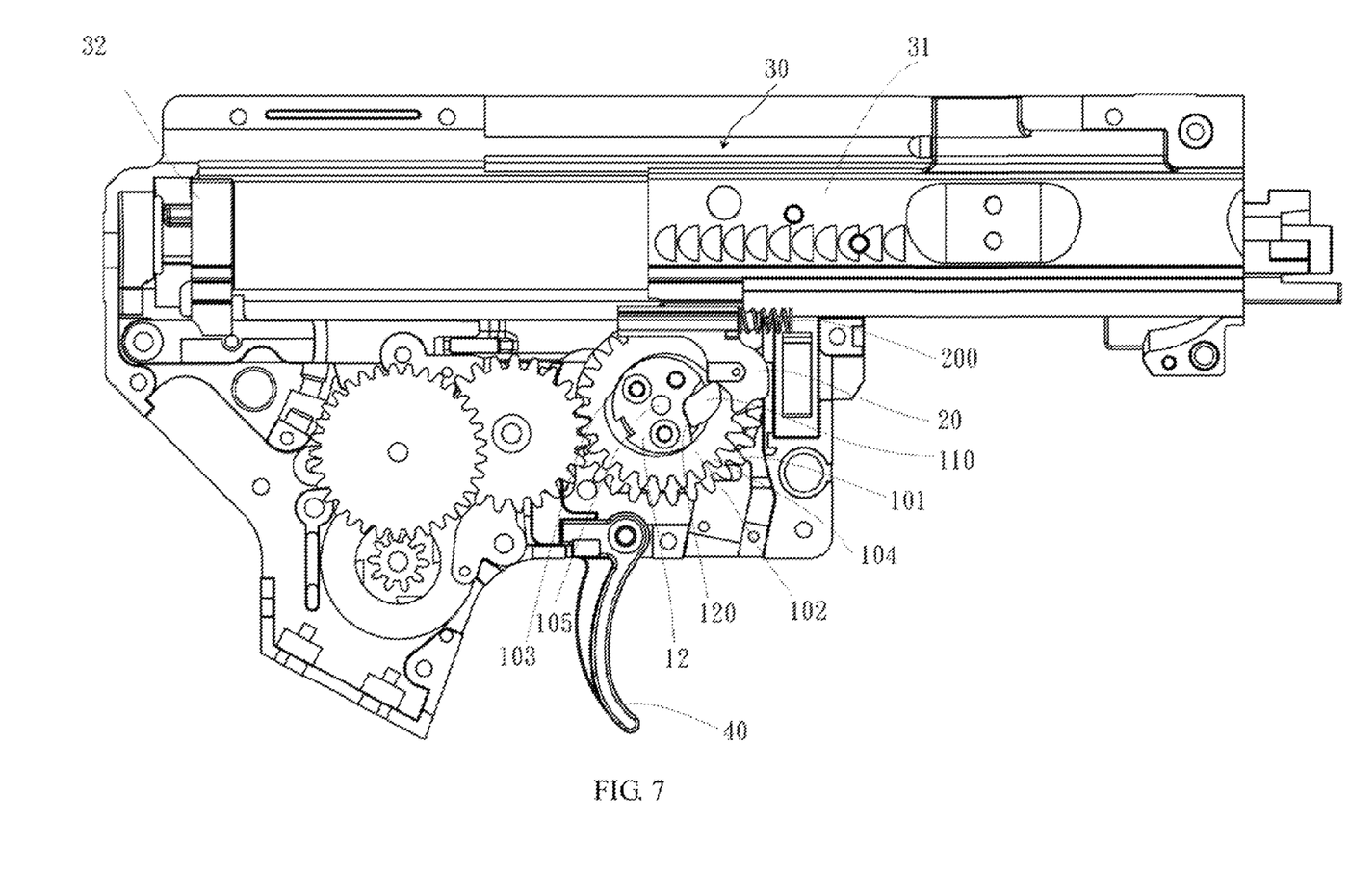
FIG. 7 is a schematic view showing that the movement control assembly of the present invention pushes the detent block during the rotation of the gear assembly such that the detent block moves to the receiving recess.

Please refer to FIG. 6 and FIG. 7. When the detent block 110 rotates to the position of movement control assembly 20, the detent block 110 will abut against the movement control assembly 20 (i.e., the movement control assembly 20 will block the rotation route of the detent block 110), and thus be pushed by the movement control assembly 20, whereby the detent assembly 11 will pivotally rotate around the pivot point of movement control gear 100, so that the detent block 110 will move to the receiving recess 120, against the elastic force of the torsion spring 111. At this time, the detent assembly 11 disengages from the securing recess 103 of the ring gear 102, and even if the ring gear 102 continuously rotates, it cannot drive the movement control gear 100 to rotate therewith.

Figure 8:
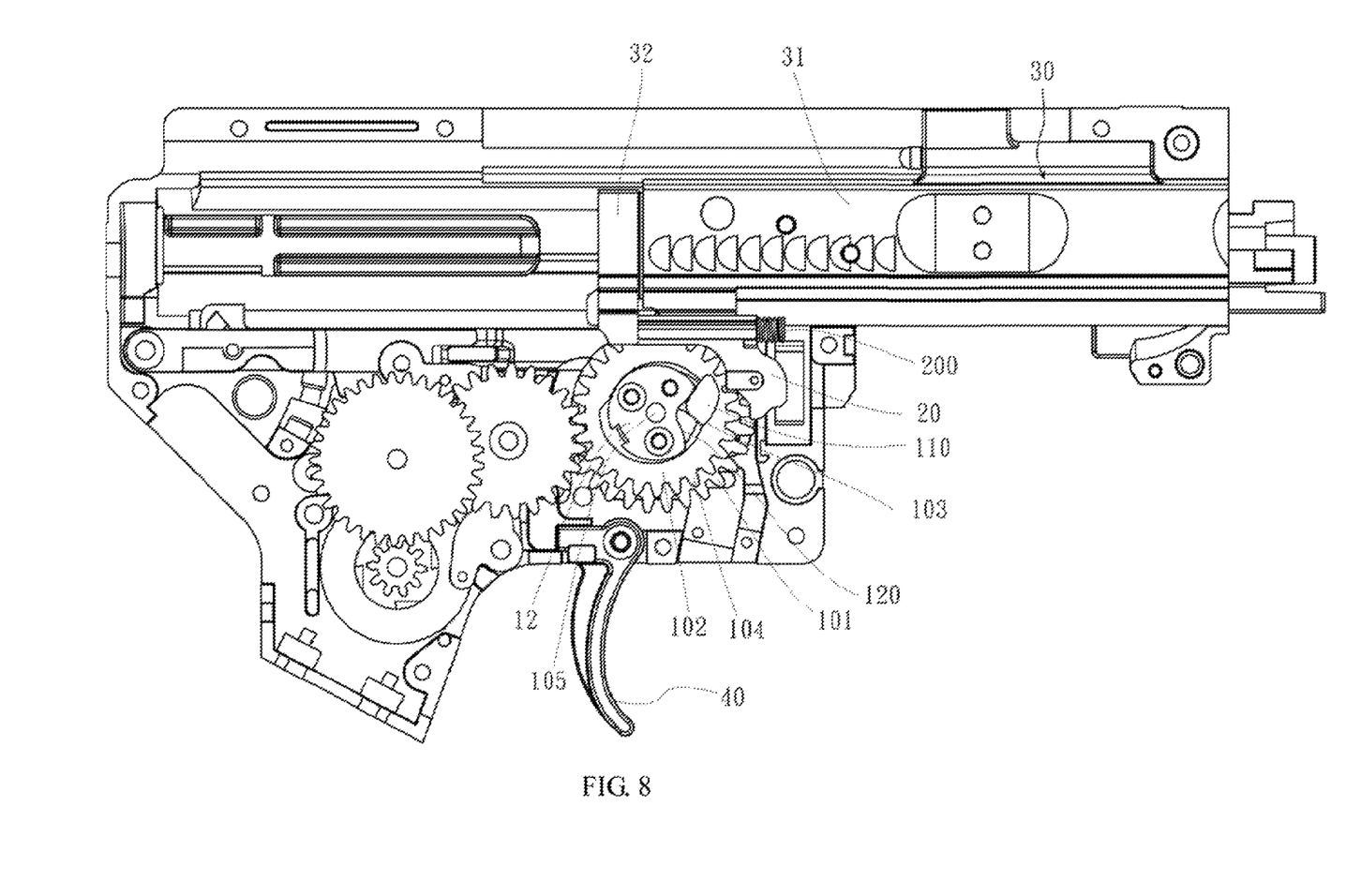
FIG. 8 is schematic view showing that the movement control assembly of the present invention moves away from the detent block during the rotation of the gear assembly such that the detent block moves to securing recess.

Please refer to FIG. 8. When a user pushes a trigger 40 and thus the piston 32 of the firing action 30 move forward (i.e., the right direction in the figure) to the locating position, the piston 32 will push the movement control assembly 20, so that the movement control assembly 20 will resist the elastic force of the return spring 200 and disengage from the position of pushing the detent block 110 (i.e., being away from the detent block 110), and then the detent block 110 will move toward the outside direction of the gear assembly 10 again and leave the receiving recess 120 due to the elastic force of the torsion spring 111. Finally, the detent block 110 will engage with the securing recess 103 of the ring gear 102 again. At this time, the movement control gear 100 can be driven to rotate again due to the rotation of the ring gear 102.

Figure 9:
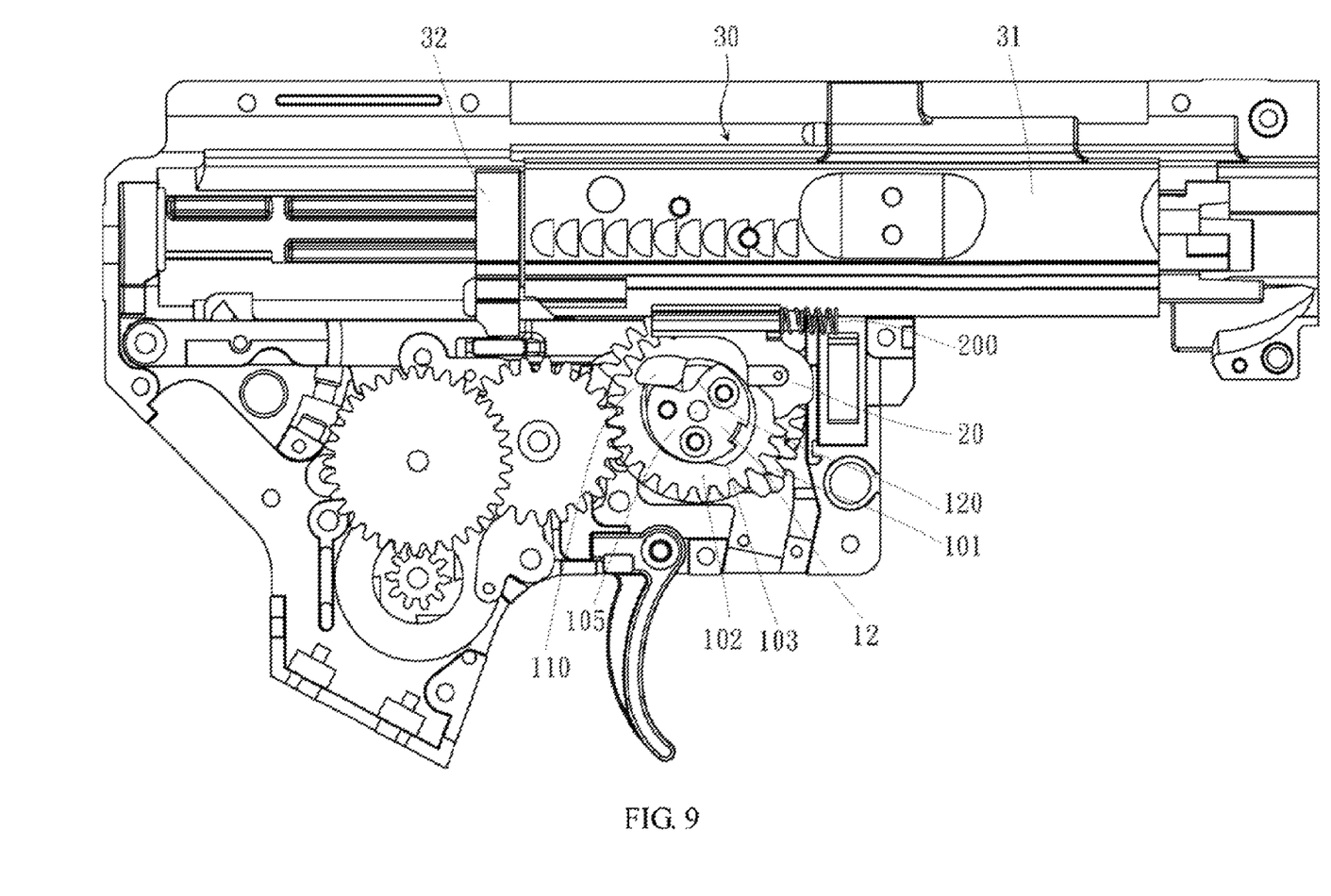
FIG. 9 is a schematic view showing that the movement control gear drives the firing action to move backward again during the rotation of the gear assembly according to the present invention.

Please refer to the FIG. 9. Since the movement control gear 100 is driven to run again by the ring gear 102, when the teeth 101 of the movement control gear 100 mesh with the cylinder 31 of the firing action 31 again, the cylinder 31 and the piston 32 will be driven to move backward (i.e., the left direction in the figure). And after the piston 32 moves backward, the movement control assembly 20 will not be pushed by the piston 32 and will return to the position of abutting against or pushing) the detent block 110 due to the elastic force of the return spring 200. Thus, the conventional problem of meshing dislocation between the teeth 101 of the movement control gear 100 and the cylinder 31 of the firing action 30 will totally not happen.

When the electric power is cut off, the user also can pull the firing action 30 backward manually and disengage the teeth 101 of movement control gear 100 completely from the cylinder 31. At this time, the user can perform the one-bullet-shot in a manual manner.

By above-described method and mechanism, the present invention can not only prevent the problem of non-working of the firing action when the electric power is cut off, but also prevent the situation that the meshing dislocation happened between the firing, action and the gear assembly causes the non-working of the firing action under normal electric power. Thus, no matter the electric power supply is normal or not, the operation of the firing action can proceed normally.

What is claimed is:

1. A transmission mechanism for a toy gun comprising a gear assembly that can mesh with a firing action and a movement control assembly that can control the movement of the gear assembly, wherein the gear assembly at least comprises:
   a movement control gear, of which the partial outer periphery is provided with teeth;
   a ring gear, which can engage with the movement control gear and can selectively move with the movement control gear, and of which the inner edge is provided with at least a securing recess, and the outer edge is provided with teeth; and
   a detent assembly, which is located in the ring gear, and of which one end is eccentrically pivotally mounted on the movement control gear, and the other end is detachably positioned in the securing recess of the ring gear, the detent assembly being provided with a detent block exposed outside the ring gear;
   wherein the movement control assembly can abut against or move away from the detent block of the detent assembly, so that the detent block can disengage from or be secured in the securing recess.

2. The transmission mechanism for a toy gun as claimed in claim 1, further comprising a cover which is located outside the ring gear to position the detent assembly in the ring gear, and has a receiving recess for receiving the detent block of the detent assembly.

3. The transmission mechanism for a toy gun as claimed in claim 2, wherein the firing action comprises a cylinder and a piston, and the cylinder and the piston can store elastic force respectively by means of an elastic assembly.

4. The transmission mechanism for a toy gun as claimed in claim 2, wherein the ring gear is provided with securing recesses respectively formed at the opposing positions on the inner side of the ring gear.

5. The transmission mechanism for a toy gun as claimed in claim 2, further comprising a central shaft which threads through the centers of the movement control gear, the ring gear and the cover; and a torsion spring through which the detent assembly is mounted in the ring gear, one end of the torsion spring abutting against the central shaft, and the other end abutting against one side of the detent assembly.

6. The transmission mechanism for a toy gun as claimed in claim 2, wherein the movement control assembly further comprises a return spring.

7. The transmission mechanism for a toy gun as claimed in claim 1, wherein the gear assembly is driven by an electric motor to rotate via a gear or a belt.

8. The transmission mechanism for a toy gun as claimed in claim 7, wherein the firing action comprises a cylinder and a piston, and the cylinder and the piston can store elastic force respectively by means of an elastic assembly.

9. The transmission mechanism for a toy gun as claimed in claim 7, wherein the ring gear is provided with securing recesses respectively formed at the opposing positions on the inner side of the ring gear.

10. The transmission mechanism for a toy gun as claimed in claim 7, further comprising a central shaft which threads through the centers of the movement control gear, the ring gear and the cover; and a torsion spring through which the detent assembly is mounted in the ring gear, one end of the torsion spring abutting against the central shaft, and the other end abutting against one side of the detent assembly.

11. The transmission mechanism for a toy gun as churned in claim 7, wherein the movement control assembly further comprises a return spring.

12. The transmission mechanism for a toy gun as claimed in claim 1, wherein the firing action comprises a cylinder and a piston, and the cylinder and the piston can store elastic force respectively by means of an elastic assembly.

13. The transmission mechanism for a toy gun as claimed in claim 1, wherein the ring gear is provided with securing recesses respectively formed at the opposing positions on the inner side of the ring gear.

14. The transmission mechanism for a toy gun as claimed in claim 1, wherein the movement control assembly further comprises a return spring.

\* \* \* \* \*